United States Patent [19]

Dyroff et al.

[11]  4,233,422
[45]  Nov. 11, 1980

[54] PROCESS FOR STABILIZING ACETAL CARBOXYLATE POLYMERS USING DIALKYL SULFATE

[75] Inventors: David R. Dyroff, Creve Coeur; Gary J. Lynch, St. Louis, both of Mo.

[73] Assignee: Monsanto Company, St. Louis, Mo.

[21] Appl. No.: 78,274

[22] Filed: Sep. 24, 1979

[51] Int. Cl.$^3$ .......................... C08G 6/00; C08L 61/02
[52] U.S. Cl. ................................. 525/398; 528/232; 528/487; 528/488
[58] Field of Search ................ 525/398, 401; 528/232, 528/487, 488

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | 525/401 |
| 4,146,495 | 3/1979 | Crutchfield et al. | 252/89 R |

*Primary Examiner*—Lucille M. Phynes

*Attorney, Agent, or Firm*—S. M. Tarter; W. H. Duffey; F. D. Shearin

[57] ABSTRACT

The alkali metal, ammonium and alkanol amine salts of polymeric acetal carboxylates are stable detergent builders under laundry use conditions, but depolymerize in acid media, making the polymer fragments more readily biodegradable in waste streams. Now, in the improved process of the present invention for preparing an acetal carboxylate polymer wherein an ester of glyoxylic acid and a polymerization initiator are brought together under polymerization conditions and a chemically stable end group is added to the termini of the resulting polymer to stabilize the polymer against rapid depolymerization in alkaline solution, the improvement comprises adding to the resulting polymer a sufficient amount of an alkali metal hydride, preferably sodium hydride, and a dialkyl sulfate having 1 to about 20 carbon atoms in each alkyl group, preferably dimethyl sulfate, to add to the termini of the resulting polymer an alkyl group derived from the dialkyl sulfate.

8 Claims, No Drawings

PROCESS FOR STABILIZING ACETAL CARBOXYLATE POLYMERS USING DIALKYL SULFATE

BACKGROUND OF THE INVENTION

This invention relates to an improved method of preparing polymeric acetal carboxylates, which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STPP) has been found to be highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates have been found to be suitable as a replacement for STPP in detergent compositions. The composition of such polymeric acetal carboxylates has been disclosed in U.S. Pat. No. 4,144,226 issued Mar. 13, 1979 and in Ser. No. 962,512 filed Nov. 20, 1978. The use of such polymeric acetal carboxylates in detergent compositions is disclosed in U.S. Pat. No. 4,146,495 issued Mar. 27, 1979. A preferred method for the saponification of the esters of the polymeric acetal carboxylates to form the corresponding alkali metal salt is disclosed in U.S. Pat. No. 4,140,676 issued Feb. 20, 1979. The polymeric acetal carboxylate salts described in the above applications and patents were tested for sequestration function using the procedures described by Matzner et al in "Organic Builder Salts as Replacements for Sodium Tripolyphosphate", TENSIDE, 10, No. 3, pages 119-125 (1973). As a result of such tests, the polymeric acetal carboxylate salts were found to be superior detergent builders compared to STPP, and were stable under laundry use conditions but depolymerized at lower pH making the polymers more readily biodegradable.

Although the methods for preparing the polymeric acetal carboxylates disclosed in the above patents and patent applications are satisfactory, there is a need for improved processes to prepare such materials. Now, according to the present invention, an improved process is provided for preparing the polymeric acetal carboxylates wherein a stable end group, to stabilize the polymer against rapid depolymerization in alkaline solution, derived from a dialkyl sulfate is disclosed. The resulting stabilized polymer is remarkably stable in alkaline solution.

SUMMARY OF THE INVENTION

These and other advantages are achieved in a process for preparing an acetal carboxylate polymer wherein an ester of glyoxylic acid and a polymerization initiator are brought together under polymerizationconditions and a chemically stable end group is added to the termini of the resulting polymer to stabilize the polymer against rapid depolymerization in alkaline solution, in which the improvement comprises adding to the resulting polymer a sufficient amount of an alkali metal hydride and a dialkyl sulfate having 1 to about 20 carbon atoms in each alkyl group to add to the termini of the resulting polymer an alkyl group derived from the dialkyl sulfate.

For the purposes of this invention, the term "rapid depolymerization in alkaline solution" as it is used in the specification and claims shall mean that in an aqueous solution of 0.5 molar sodium hydroxide containing 10 grams per liter of the polymer product of the present invention, the average chain length of the polymeric acetal carboxylate will be reduced by more than 50 percent, as determined by Proton Magnetic Resonance, after 1 hour at 20° C.

The procedure for bringing together in a reaction zone under polymerization conditions an ester of glyoxylic acid and a polymerization initiator, and optionally one or more comonomers, has been described in detail in U.S. Pat. No. 4,144,226 issued Mar. 13, 1979 and such description is herewith incorporated by reference. Broadly described, the hemiacetal form of an ester of glyoxylic acid is prepared by reacting an alcohol containing from 1 to 4 carbon atoms with an acid hemiacetal or acid hydrate under conditions known to those skilled in the art and converting the resulting ester hemiacetal to the corresponding aldehyde ester by known techniques, such as the reaction of the ester hemiacetal with phosphorus pentoxide. Thereafter, the aldehyde ester is polymerized using a suitable initiator, such as boron trifluoride etherate, 3A molecular sieves, organoaluminum compounds, and preferably dialkyl sodiomalonate or sodiomethyl malonate esters.

According to the improved process of the present invention, after the ester of glyoxylic acid and the polymerization initiator are brought together under polymerization conditions, there is then added to the resulting polymer a sufficient amount of an alkali metal hydride and a dialkyl sulfate having 1 to about 20 carbon atoms in each alkyl group to add to the termini of the resulting polymer an alkyl group derived from the dialkyl sulfate.

The alkali metal hydride useful in the process of the present invention can be lithium hydride, sodium hydride, potassium hydride and mixtures thereof. Sodium hydride is preferred because of its ready availability. Other sources of an alkali metal such as an alkali metal hydroxide or a dispersion of the alkali metal in a suitable solvent such as mineral oil plus reaction solvent, were largely ineffective.

The amount of alkali metal hydride can vary within wide limits. It is preferred to use at least 2 moles of alkali metal hydride for each mole of resultant polymer to provide an alkali metal at the polymer termini. When less than about 2 moles of alkali metal hydride for each mole of resultant polymer is used, there is a corresponding decrease in the yield of the polymer that is stabilized against rapid depolymerization in alkaline solution. On the other hand, when amounts significantly greater than about 2 moles of alkali metal hydride per mole of resultant polymer are used, additional stability against rapid depolymerization in alkaline solution is not achieved; however, the presence of some excess alkali metal hydride is preferred to insure that there is a sufficient amount of the alkali metal hydride to maximize yields. It is preferred to use at least about a 20 percent molar excess over the 2 moles of alkali metal hydride for each mole of resultant polymer. For example, if a homopolymer of polymeric acetal carboxylate is prepared having a chain length which averages about 50 repeating units, then about 0.04 mole of alkali metal hydride would be required for each mole of acetal carboxylate monomer. To provide a 20 percent molar excess, about 0.05 mole of alkali metal hydride would be required. Greater quantities can be used since the excess alkali metal hydride is generally insoluble in the reaction solvent and can be easily removed from the reaction zone by physical means, e.g., filtration, sedimentation, centrifugation and the like.

The dialkyl sulfates useful in the process of the present invention are known to those skilled in the art. Each alkyl group in the dialkyl sulfate can be alike or different and can contain from 1 to about 20 carbon atoms. However, as is known to those skilled in the art, the reactivity of the dialkyl sulfate decreases with increasing chain lengths and hence, it is preferred that the alkyl groups are alike and that each alkyl group contains from 1 to about 4 carbon atoms. It is especially preferred to use dimethyl sulfate. However, in the event that those skilled in the art wish to obtain a combination builder and surfactant, the alkyl groups in the dialkyl sulfate should contain from 8 to 20 carbon atoms, although the reactivity may be somewhat slow.

Because the resultant polymer obtained from the ester of glyoxylic acid and the polymerization initiator may be somewhat viscous, a suitable solvent may be used during the step of adding to the resulting polymer a sufficient amount of an alkali metal hydride and a dialkyl sulfate to add to the termini of the resulting polymer an alkyl group derived from the dialkyl sulfate. Any number of solvents known to those skilled in the art can be used, preferably at levels from about one-third to about 1 volume of solvent for each volume of polymerized acetal carboxylate. It is only necessary that the solvent is miscible with the resulting polymer, does not react with the polymer or the other reagents, and effectively decreases the viscosity of the resultant polymer. Suitable solvents include those that are normally used for anionic alkylations, such as N,N-dimethylformamide, hexamethylphosphoric triamide, N,N-dimethylacetamide and the like. N,N-dimethylformamide is preferred. Solvents such as acetone, methylene chloride and the like are not preferred because of potential side reactions in the presence of the sodium hydride.

As will occur to those skilled in the art, at least two moles of dialkyl sulfate for each mole of resulting polymer are required to satisfy the stoichiometry. However, to insure that high yields of stabilized polymer are obtained in a short time, it is preferred to use at least 6 moles of dialkyl sulfate per mole of resulting polymer, and even more preferred to use about 10 moles of dialkyl sulfate per mole of resulting polymer.

The conditions for adding the chemically stable group to the polymer termini according to the process of the present invention can vary within wide limits depending on the desired average chain length. The unstabilized polymer is in equilibrium with the monomer, and lower temperatures favor the formation of the polymer. Consequently, endcapping at lower temperatures provides a polymer with a higher average chain length. In addition, temperature control during endcapping will influence molecular weight distribution since wide fluctuations in temperature during the endcapping reaction will produce greater variations in the molecular weight distribution. To produce a polymer suitable for detergent applications, it is preferred to maintain the temperature range during the reaction from about $-10°$ C. to about $10°$ C. Satisfactory results are obtained at atmospheric pressure although higher or lower pressures could be used as will occur to those skilled in the art.

The sequence of addition of the alkali metal hydride and the dialkyl sulfate can affect the chain length and/or the yield of the resulting polymer product. It is preferred to add the dialkyl sulfate to the polymer and thereafter add the alkali metal hydride, although some polymer product will be obtained when the alkali metal hydride is added first.

The polymer, which is now stabilized against rapid depolymerization in alkaline solution, is useful as an intermediate to prepare the corresponding alkali metal, ammonium or alkanol amine salts. It is only necessary to saponify the stabilized polymeric ester with a base, such as lithium hydroxide, sodium hydroxide, potassium hydroxide and the like, using conventional saponification techniques to make a salt suitable for use as a builder and as a sequestrant. The ammonium or alkanol amine salts can be prepared from the corresponding alkali metal salts using conventional ion exchange techniques.

The amount of polymer salt required to effectively complex the ions in a given system will depend to some extent on the particular polymer salt being used and the particular metal ion in the aqueous medium. Optimum conditions and amounts of the polymer salt to be used can readily be determined by routine experimentation.

The polymer salts are also useful as builders in detergent formulations. Since the pH of the detergent solution is usually between pH 9 and pH 11, the polymer salts will not depolymerize rapidly when used as a detergent builder in aqueous solution at normal use concentrations (about 1200–1500 ppm formulation in the wash water), temperatures ($10°-60°$ C.) and times (i.e., about 15 minutes) typical of United States home laundry practices. Generally the use of the alkali metal salts, particularly the sodium salt, is preferred. However, in some formulations where greater builder solubility is required, the use of ammonium or alkanol amine salts may be desirable.

The detergent formulations will contain at least 1 percent by weight and preferably at least 5 percent by weight of the polymer salts. In order to obtain the maximum advantages of the polymer salts as builders, the detergent should preferably contain from about 5 percent to about 75 percent of these salts. The polymer salts can be the sole detergency builder, or the polymer salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil antiredeposition agents, perfumes and the like, will be in accordance with well understood practices of detergent formulation.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous ester aldehyde useful to prepare the polymers of the present invention.

A 2-liter, 4-necked, round bottom flask equipped with an overhead stirrer, thermometer and 30 centimeter Vigreaux column and take-off head, is charged with 1200 grams (10 moles) of methyl glyoxylate methyl hemiacetal. A total of 568 grams of phosphorus pentoxide (4 moles) is added in 4-6 portions, keeping the reaction temperature below 90° C. The addition requires requires about 90 minutes. When the addition is complete, the mixture is stirred until the temperature has fallen to about 70° C. (0.5 hour). The mixture is distilled at aspirator vacuum (20–40 torr) yielding 764 grams crude methyl glyoxylate having a boiling point of 56°–61° C.; the distillation is stopped when the pot temperature reaches 125° C. since a violent decomposition may occur at higher temperatures. Chromatographic analysis of this crude material indicates 86.6 percent glyoxylate, 9.3 percent methyl dimethoxyacetate, 3.3 percent dimethyl oxalate and trace amounts of unidentified products.

The crude product is then distilled from 25 grams of 3A molecular sieves (which had been heated to about 125° C. to drive off residual moisture and organics) through the Vigreaux column. A 15-gram forecut of about 97 percent pure glyoxylate is collected initially. The Vigreaux column is replaced by a 30.5 centimeter Widmer column and 521 grams of 99 percent pure polymerizable grade methyl glyoxylate is collected having a boiling point of 83°–84° C. at 210 torr. A final cut of 36 grams (93 percent pure) ester is collected in a final fraction (91°–94° C.; 210 torr). The overall yield of polymerizable glyoxylate is 59 percent from the hemiacetal.

The polymerizable glyoxylate is stored in a glass-stoppered bottle at −70° C. until ready for use.

EXAMPLE II

This Example illustrates the preferred process of the present invention.

To a 100 milliliter, 3-necked, round bottom flask equipped with an efficient stirrer and a thermometer was added 22.2 grams of the aldehyde ester from Example I (0.2 mole), and 6.2 milliliters of dimethyl formamide (5.9 grams). The mixture was cooled to about 0° C. and then 150 microliters of 0.05 molar sodium dimethyl methyl malonate in tetrahydrofuran was added. The temperature spontaneously rose to about 34° C. The mixture was cooled to 0° C. and stirred at that temperature for about 40 minutes. Then, 7.2 milliliters (0.95 gram) of dimethyl sulfate (0.3 mole per mole of monomer) was added to the reaction flask and then 0.5 gram of dry sodium hydride (0.083 mole per mole of monomer) was added. The flask was maintained at a temperature between 0° and 7° C. with stirring for about 16 hours.

Then, about 50 milliliters of sodium bicarbonate solution was added to the reaction flask at 0° C. along with a few drops of NaOH solution to insure that the pH was maintained above pH 7. After about 10 minutes, the aqueous solution was decanted. Then, there were added with cooling and stirring 27.5 milliliters of 10 normal NaOH solution. The temperature rose slowly to about 40° C. The mixture was stirred overnight and then 40 milliliters of methanol were added. The solution was stirred for about 30 minutes and the white precipitate was collected on a sintered glass funnel. It was washed twice with methanol and then twice with diethyl ether and dried for one hour on the sintered funnel using aspirator vacuum to give 18.6 grams of a solid product (77 percent yield). Analysis by NMR confirmed the presence of the acetal carboxylate polymer and small amounts of monomer and sodium methyl sulfate.

A sample of the polymer is tested for sequestration function using the procedure described by Matzner et al, "Organic Builder Salts as Replacements for Sodium Tripolyphosphate", TENSIDE, 10, No. 3, pages 119-125 (1973). The sequestration of calcium ions and magnesium ions as a percent of STP performance shows that the polymer salt is about 96 percent of STP.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. In a process for preparing an acetal carboxylate polymer wherein an ester of glyoxylic acid and a polymerization initiator are brought together under polymerization conditions, and a chemically stable end group is added to the termini of the resulting polymer to stabilize the polymer against rapid depolymerization in alkaline solution, the improvement which comprises adding to the resulting polymer a sufficient amount of an alkali metal hydride and a dialkyl sulfate having 1 to about 20 carbon atoms in each alkyl group to add to the termini of the resulting polymer an alkyl group derived from the dialkyl sulfate.

2. In a process of claim 1 wherein at least 2 moles of alkali metal hydride are added for each mole of resultant polymer.

3. In a process of claim 2 wherein the alkali metal hydride is sodium hydride.

4. In a process of claim 1, 2 or 3 wherein the amount of dialkyl sulfate is at least two moles per mole of resultant polymer.

5. In a process of claim 1, 2 or 3 wherein the amount of dialkyl sulfate is at least six moles per mole of polymer.

6. In a process of claim 1, 2 or 3 wherein the amount of dialkyl sulfate is about 10 moles per mole of polymer.

7. In a process of claim 1, 2 or 3 wherein the dialkyl sulfate has 1 to about 4 carbon atoms in each alkyl group.

8. In a process of claim 1, 2 or 3 wherein the dialkyl sulfate is dimethyl sulfate.

* * * * *